(12) United States Patent  
Matsubara et al.

(10) Patent No.: US 11,239,771 B2  
(45) Date of Patent: Feb. 1, 2022

(54) MOTOR SYSTEM

(71) Applicants: Toyota Jidosha Kabushiki Kaisha, Toyota (JP); Denso Corporation, Kariya (JP)

(72) Inventors: Kiyotaka Matsubara, Ichinomiya (JP); Makoto Nakamura, Okazaki (JP); Daigo Nobe, Toyota (JP); Ryuji Omata, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 16/360,472

(22) Filed: Mar. 21, 2019

(65) Prior Publication Data

US 2019/0296664 A1    Sep. 26, 2019

(30) Foreign Application Priority Data

Mar. 22, 2018 (JP) .............................. JP2018-055319

(51) Int. Cl.

| H02P 6/08 | (2016.01) |
|---|---|
| H02P 27/06 | (2006.01) |
| H02P 21/22 | (2016.01) |
| H02P 6/12 | (2006.01) |
| H02P 11/00 | (2006.01) |
| H02M 7/42 | (2006.01) |
| B60L 15/02 | (2006.01) |
| H02P 6/04 | (2016.01) |

(52) U.S. Cl.

CPC .............. *H02P 6/08* (2013.01); *B60L 15/025* (2013.01); *H02M 7/42* (2013.01); *H02P 6/12* (2013.01); *H02P 11/00* (2013.01); *H02P 21/22* (2016.02); *H02P 27/06* (2013.01); *H02P 2006/045* (2013.01)

(58) Field of Classification Search

USPC .................................... 318/800, 801, 400.02  
See application file for complete search history.

(56) References Cited

U.S. PATENT DOCUMENTS

| 5,016,158 A * | 5/1991 | Matsui ..................... H02M 7/49 363/40 |
| 6,242,884 B1 * | 6/2001 | Lipo ......................... H02P 3/18 318/496 |

(Continued)

FOREIGN PATENT DOCUMENTS

| JP | 2000125411 A | 4/2000 |
| JP | 2000324871 A | 11/2000 |

(Continued)

*Primary Examiner* — Jorge L Carrasquillo  
(74) *Attorney, Agent, or Firm* — Dinsmore & Shohl LLP

(57) ABSTRACT

A control unit calculates a motor voltage vector including a corresponding excitation voltage command and a torque voltage command in response to an output request for the motor and changes a first inverter voltage vector and a second inverter voltage vector while maintaining the motor voltage vector obtained to allow distribution of the motor voltage vector at any ratio. The first inverter voltage vector includes a first excitation voltage command and a first torque voltage command associated with an output from the first inverter, and the second inverter voltage vector includes a second excitation voltage command and a second torque voltage command associated with an output from the second inverter.

17 Claims, 15 Drawing Sheets

(56) References Cited

U.S. PATENT DOCUMENTS

| | | | | |
|---|---|---|---|---|
| 8,102,142 B2* | 1/2012 | Smith | ............... | H02J 1/102 |
| | | | | 318/801 |
| 2006/0164028 A1* | 7/2006 | Welchko | ............... | B60L 15/025 |
| | | | | 318/105 |
| 2007/0013325 A1* | 1/2007 | Kiuchi | ............... | H02P 5/747 |
| | | | | 318/34 |
| 2011/0221375 A1* | 9/2011 | Suzuki | ............... | H02P 27/08 |
| | | | | 318/496 |
| 2019/0229669 A1* | 7/2019 | Yamakawa | ............... | H02P 23/03 |
| 2019/0252994 A1* | 8/2019 | Kobayashi | ............... | B60L 7/14 |
| 2019/0256129 A1* | 8/2019 | Oka | ............... | H02P 21/0003 |
| 2019/0260324 A1* | 8/2019 | Kuramitsu | ............... | B62D 5/0484 |

FOREIGN PATENT DOCUMENTS

| | | |
|---|---|---|
| JP | 2006238686 A | 9/2006 |
| JP | 2009-273348 A | 11/2009 |

* cited by examiner

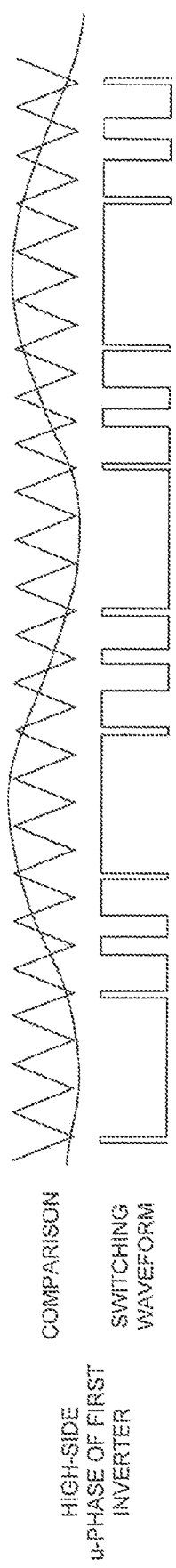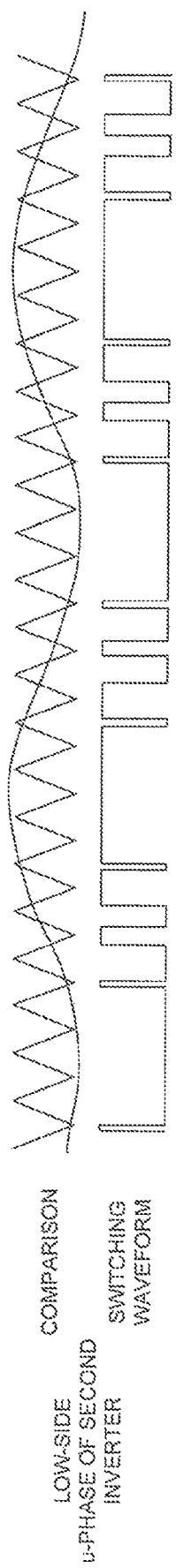

APPLIED VOLTAGE

PHASE CURRENT

MOTOR SYSTEM

CROSS REFERENCE TO RELATED APPLICATION

This application claims priority to Japanese Patent Application No. 2018-055319 filed on Mar. 22, 2018, which is incorporated herein by reference in its entirety including the specification, claims, drawings, and abstract.

TECHNICAL FIELD

The present disclosure relates to a motor system including two power supplies and two inverters. In the motor system, one motor is driven by outputs from the two inverters.

BACKGROUND ART

JP 2000-324871 A discloses a motor system including two power supplies and two inverters. In this motor system, one motor is driven by outputs from the two inverters. In this system, each phase of the star-connected motor includes two windings connected in series. One inverter is connected to a winding end of each phase, and the other inverter is connected to an intermediate point between the windings. Accordingly, it is possible to drive the motor by an output from one inverter, using the two windings (a first drive winding), connected in series and to drive the motor by an output from the other inverter, using the winding disposed in the inner side of the intermediate point (a second drive winding).

Furthermore, JP 2000-125411 A discloses a system including two power supplies; that is, a battery and a fuel cell, and two inverters which are respectively connected to the power supplies. Herein, outputs of the two inverters are respectively connected to both ends of a three-phase coil of one motor. In this system, the two inverters are controlled independently while the battery and the fuel cell are made to have an equal midpoint voltage so as to meet a requirement of output from a motor, changing output from the battery and without changing output from the fuel cell.

In JP 2000-324871 A, an inner winding included in a second drive winding is used in a first drive winding. Herein, basically two separate drive windings are used. An output torque request for a motor is distributed to motor output torque by the first drive winding and motor output torque by the second drive winding so as to reduce motor losses. However, JP 2000-324871 A does not describe how to use two power supplies and two inverters. Accordingly, it is not clear how to control two power supplies and two inverters to build an effective system.

In JP 2000-125411 A, because of difficulty in changing an output from a fuel cell, a difference between an output torque request for a motor and motor output torque by the fuel cell is allocated to a motor output by a battery. Accordingly, there is no degree of freedom in using two power supplies and two inverters, which makes it difficult to build an effective system.

SUMMARY

A motor system according to the present disclosure includes: a first inverter which converts direct current power from a first power supply into alternating current power; a second inverter which converts direct current power from a second power supply into alternating current power; a motor which is driven by the alternating current power from the first inverter and the alternating current power from the second inverter; and a control unit which calculates a motor voltage vector including a corresponding excitation voltage command vd and a torque voltage command vq in response to an output request for the motor and changes a first inverter voltage vector V (INV1) and a second inverter voltage vector V (INV2) while maintaining the motor voltage vector obtained to allow distribution of the motor voltage vector at any ratio, wherein the first inverter voltage vector V (INV1) includes a first excitation voltage command vd1 and a first torque voltage command vq1 associated with an output from the first inverter, and the second inverter voltage vector V (INV2) includes a second excitation voltage command vd2 and a second torque voltage command vq2 associated with an output from the second inverter.

The control unit may change the first inverter voltage vector V (INV1) and the second inverter voltage vector V (INV2) in magnitude.

The control unit may invert a positive or a negative direction of either the first inverter voltage vector V (INV1) or the second inverter voltage vector V (INV2) with respect to a positive or a negative direction of the motor voltage vector.

The control unit may change at least one of the first inverter voltage vector V (INV1) and the second inverter voltage vector V (INV2) in phase.

The control unit may calculate the phase of the first inverter voltage vector V (INV1) and the phase of the second inverter voltage vector V (INV2) based on a phase of a motor current.

The first power supply and the second power supply may include an electric storage device, and the control unit may change the first inverter voltage vector V (INV1) and the second inverter voltage vector V (INV2) in magnitude to reduce an output from a low-charged power supply or to restrict charging of a high-charged power supply according to states of charge of the first power supply and the second power supply.

The control unit may change the first inverter voltage vector V (INV1) and the second inverter voltage vector V (INV2) in magnitude to restrict an output from a high-temperature inverter according to temperatures of the first power supply and the second power supply.

The control unit may change the first inverter voltage vector V (INV1) and the second inverter voltage vector V (INV2) in magnitude or in phase to change a motor current in shape.

The first inverter and the second inverter may control a motor current by PWM, and the control unit may change the first inverter voltage vector V (INV1) and the second inverter voltage vector V (INV2) in phase to shift a dead time section in switching the first and the second inverters and a zero-crossing position of a motor current.

The first power supply and the second power supply may include an electric storage device, and the control unit may change the first inverter voltage vector V (INV1) and the second inverter voltage vector V (INV2) in magnitude or in phase according to states of charge of the first power supply and the second power supply.

The control unit may change the first inverter voltage vector V (INV1) and the second inverter voltage vector V (INV2) in magnitude or in phase to restrict an output from a high-temperature power supply according to temperatures of the first power supply and the second power supply.

In addition, the present disclosure provides a motor system, that includes: a plurality of power supplies; a plurality of inverters; and a control unit, wherein the control unit is configured to maintain a motor voltage vector V obtained by synthesizing a voltage vector V (INV) from each inverter and to distribute the motor voltage vector V to the voltage vector V (INV) from each inverter.

According to the present disclosure, the motor voltage vector of an output from the motor is distributed to the first inverter voltage vector V (INV1) and the second inverter voltage vector V (INV2) at any ratio. Therefore, it is possible to offer great freedom in driving a motor and to meet various requests such as transfer of power between power supplies and noise prevention by changing operations of two inverters while maintaining an output from the motor according to requests.

BRIEF DESCRIPTION OF DRAWINGS

Embodiment(s) of the present disclosure will be described by reference to the following figures, wherein:

FIG. 3A is a diagram illustrating a switching waveform (at a 50:50 distribution ratio) of a high-side switching element of a first inverter;

FIG. 3B is a diagram illustrating a switching waveform (at a 50:50 distribution ratio) of a low-side switching element of a second inverter;

DESCRIPTION OF EMBODIMENTS

Hereinafter, an embodiment of the present disclosure will be described with reference to the drawings. It should be noted that the present disclosure is not limited to the embodiment described herein.

"Arrangement of System"

Figure 1:
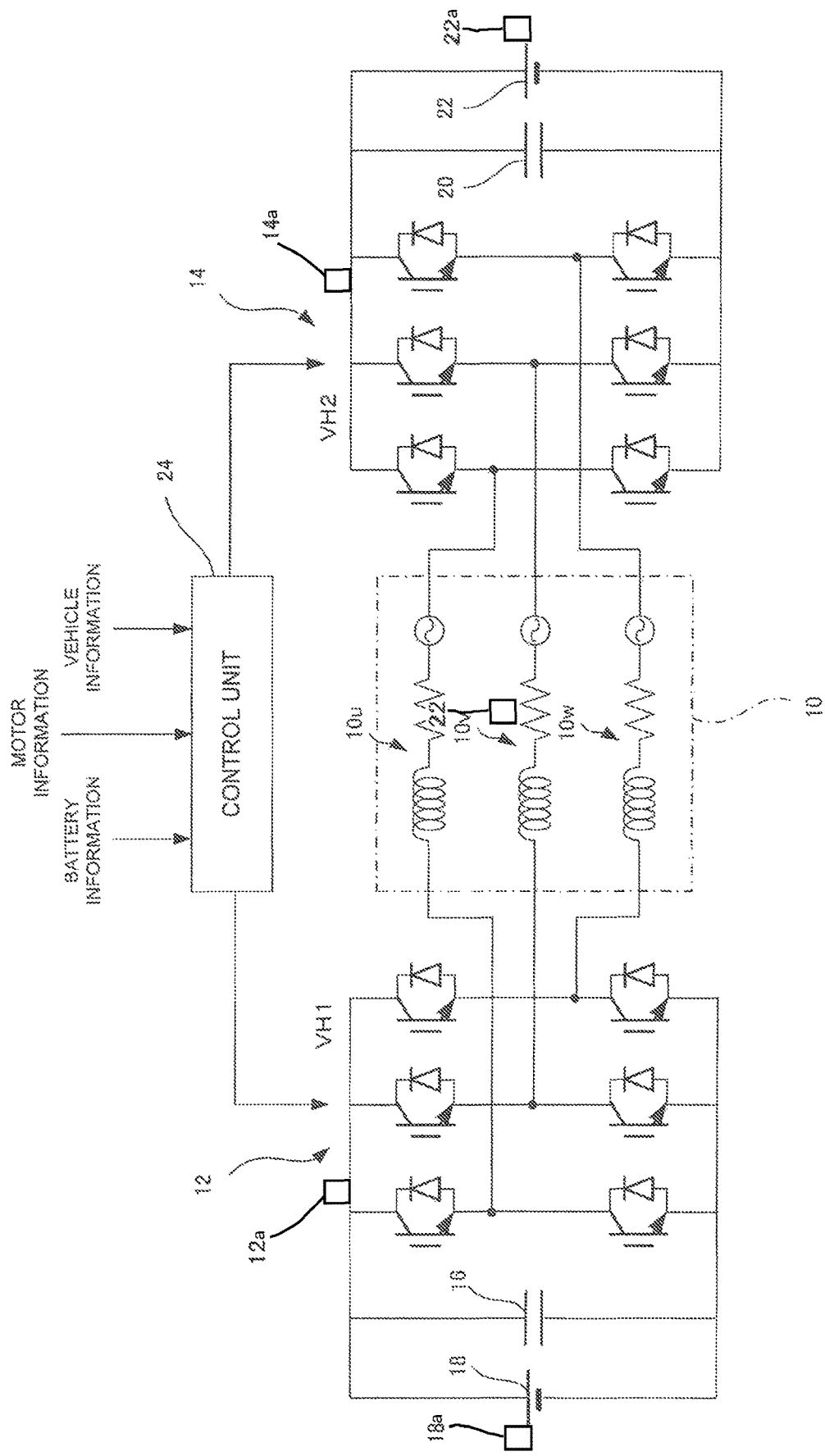
FIG. 1 illustrates a general arrangement of a motor system according to an embodiment.

FIG. 1 illustrates an arrangement of a motor system according to an embodiment. A motor 10 is a three-phase motor, including three-phase coils 10u, 10v, and 10w. Each of the coils 10u, 10v, and 10w includes a reactor component, a resistance component, and an induced electromotive force (back electromotive force) component, and those components are illustrated in the drawing as being connected to the coil in series. The system is assumed to be mounted on a vehicle, and the motor 10 is assumed to be a motor that generates a driving force for running the vehicle.

Each of the three-phase coils 10u, 10v, and 10w has one end connected to a first inverter 12 that converts direct current power to alternating current power, and each of the three-phase coils 10u, 10v, and 10w has the other end connected to a second inverter 14. In addition, to the first inverter 12, a first capacitor 16 and a first battery 18 are connected in parallel, and to the second inverter 14, a second capacitor 20 and a second battery 22 are connected in parallel. In this example, the first battery 18 and the second battery 22 are employed as a first power supply and a second power supply, but electric storage devices such as capacitors may also be employed. A first battery temperature sensor 18a is configured to detect a temperature T1 of the first battery 18, and a second battery temperature sensor 22a is configured to detect a temperature T2 of the second battery. A first inverter temperature sensor 12a is configured to detect a temperature of the first inverter 12, and a second inverter temperature sensor 14a is configured to detect a temperature of the second inverter 14a.

The first inverter 12 and the second inverter 14 are arranged in a similar manner, including three (three-phase) arms, each of which includes two switching elements connected in series. Herein, an intermediate point of the arm in each phase is connected to a corresponding phase of the coils 10u, 10v, and 10w. Accordingly, at the time of powering, power from the first battery 18 is supplied to the motor 10 through the first inverter 12, and at the time of regeneration (power generation), power from the motor 10 is supplied to the first battery 18 through the first inverter 12. The second inverter 14 and the second battery 22 also exchange power with the motor 10 in a similar manner.

In each switching element, a transistor such as an IGBT (Insulated Gate Bipolar Transistor) and a backward diode are connected in parallel. When a high-side transistor is turned on, a current flows toward a corresponding phase coil, and when a low-side transistor is turned on, a current is withdrawn from a corresponding phase coil.

A control unit 24 produces switching signals for the first inverter 12 and the second inverter 14 based on battery information, motor information, vehicle information, and the like so as to control switching of those inverters.

"Arrangement of Control Unit"

Figure 2:
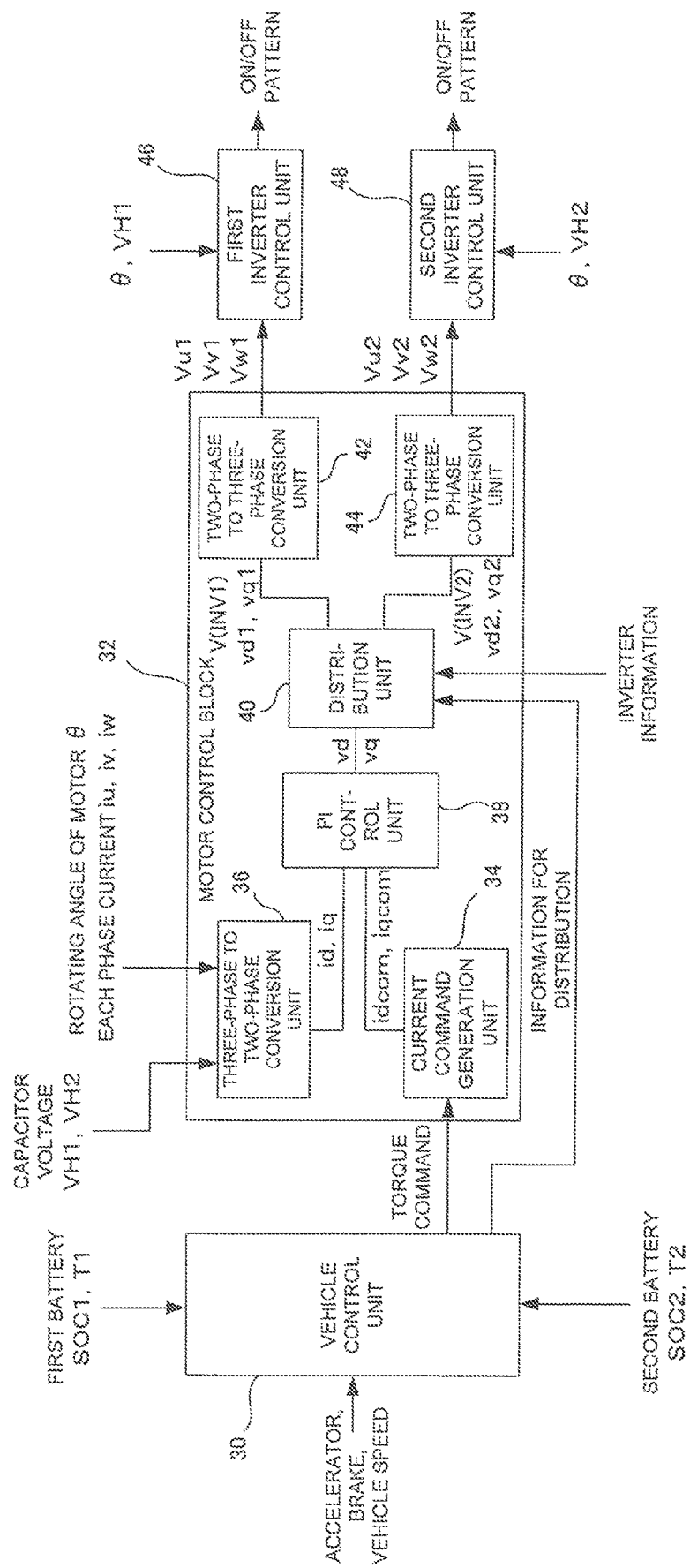
FIG. 2 is a diagram illustrating an arrangement of a control unit.

FIG. 2 illustrates an arrangement of the control unit 24. A vehicle control unit 30 receives information associated with a running vehicle, for example, control inputs of an accelerator pedal and a brake pedal and a vehicle speed, and receives battery information such as states of charge of the first battery 18 and the second battery 22 (SOC1 and SOC2) and temperatures of the first battery 18 and the second battery 22 (T1 and T2) detected by the first battery temperature sensor 18a and the second battery temperature sensor 22a, respectively. Navigation information such as road conditions and destinations may be also be supplied to the vehicle control unit 30.

The vehicle control unit 30 calculates a torque command in regard to an output request (target output torque) for the motor 10 based on, for example, the control inputs of the accelerator pedal and the brake pedal.

The calculated torque command is supplied to a current command generation unit 34 of a motor control block 32. Based on the torque command, the current command generation unit 34 calculates a d-axis current idcom and a q-axis current iqcom which are target current commands in vector control of the motor 10. A capacitor voltage VH1 of the first capacitor 16 and a capacitor voltage VH2 of the second capacitor 20, a rotor rotating angle θ of the motor 10, and each of phase currents iu, iv, and iw at the moment are supplied to a three-phase to two-phase conversion unit 36. The three-phase to two-phase conversion unit 36 converts each of the detected phase currents iu, iv, and iw into a d-axis current id and a q-axis current iq. The target current commands (d-axis and q-axis currents) idcom and iqcom from the current command generation unit 34 and the d-axis current id and the q-axis current iq from the three-phase to two-phase conversion unit 36 are supplied to a PI control unit 38, and a motor voltage vector V (d-axis excitation voltage command vd and q-axis torque voltage command vq) is calculated. The PI control unit 38 calculates a voltage command (motor voltage vector V (vd and vq)) by feedback control such as P (proportional) control and I (integral) control. Note that the feedback control may be carried out in combination with feedforward control such as predictive control.

The calculated motor voltage vector V (voltage commands vd and vq) is supplied to a distribution unit 40. The distribution unit 40 distributes the motor voltage vector V (voltage commands vd and vq) to a first inverter voltage vector V (INV1) (voltage commands vd1 and vq1) for the first inverter 12 and to a second inverter voltage vector V (INV2) (voltage commands vd2 and vq2) for the second inverter 14. The distribution performed by the distribution unit 40 will be described later.

The voltage commands vd1 and vq1 from the distribution unit 40 are supplied to a two-phase to three-phase conversion unit 42 in which those commands are converted into three-phase voltage commands Vu1, Vv1, and Vw1 for the first inverter 12 and from which those commands are output. The voltage commands vd2 and vq2 are supplied to a two-phase to three-phase conversion unit 44 in which those commands are converted into three-phase voltage commands Vu2, Vv2, and Vw2 for the second inverter 14 and from which those commands are output. Note that the current command generation unit 34, the three-phase to two-phase conversion unit 36, the PI control unit 38, the distribution unit 40, and the two-phase to three-phase conversion units 42 and 44 are included in the motor control block 32.

The three-phase voltage commands Vu1, Vv1, and Vw1 for the first inverter 12 from the two-phase to three-phase conversion unit 42 are supplied to a first inverter control unit 46, and the three-phase voltage commands Vu2, Vv2, and Vw2 for the second inverter 14 are supplied to a second inverter control unit 48. The first inverter control unit 46 receives the rotor rotating angle θ and the first inverter input voltage VH1 and produces switching signals for turning on or off the switching elements of the first inverter 12 based on a comparison of a PWM carrier (for example, triangular wave) with the voltage commands Vu1, Vv1, and Vw1. The first inverter control unit 46 then supplies the switching signals to the first inverter 12. Similarly, the second inverter control unit 48 produces switching signals for turning on or off the switching elements in the second inverter 14 and supplies the switching, signals to the second inverter 14.

In this manner, the switching of the first inverter 12 and the second inverter 14 is controlled by the signals from the control unit 24. Accordingly, outputs from the first inverter 12 and the second inverter 14 are added up, causing a flow of a desired current to the motor 10.

"Switching Waveform"

FIGS. 3A and 3B illustrates the production of switching signals in the first inverter control unit 46 and the second inverter control unit 48. In the example illustrated in FIG. 3A, the upper part of the diagram illustrates a comparison of the triangular wave with the voltage command Vu1 for a high-side u-phase switching element of the first inverter 12, and the lower part of the diagram illustrates a switching waveform obtained by the comparison result. FIG. 3B relates to a low-side u-phase switching element of the second inverter 14, and a waveform illustrated in FIG. 3B is equal to that in FIG. 3A. Due to such a switching operation, a current flows from the high-side u-phase switching element of the first inverter 12 to the low-side u-phase switching element of the second inverter 14 through the u-phase coil 10u of the motor 10. Switching waveforms of a low-side u-phase switching element of the first inverter 12 and a high-side u-phase switching element of the second inverter 14 are basically the inversion of the waveforms illustrated in FIGS. 3A and 3B. The switching operations for the first inverter 12 and the second inverter 14 are controlled in such a manner that currents having phases different from each other by 120 degrees flow through the u-phase coil 10u, the v-phase coil 10v, and the w-phase coil 10w of the motor 10. In this example, there is a period in which a voltage command continuously exceeds the triangular wave, and this period causes overmodulation PWM control.

"Motor Voltage and Current"

Figure 4A:
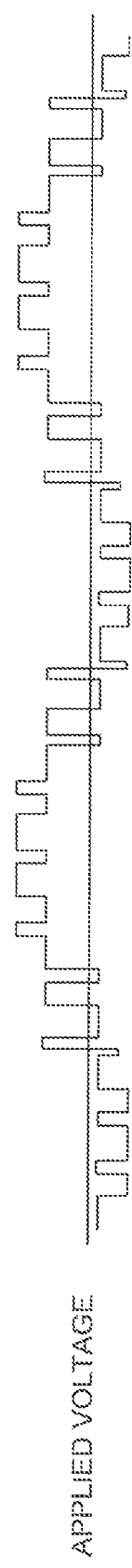
FIG. 4A is a diagram illustrating an applied voltage with respect to one phase of a motor and a waveform of a corresponding current.
Figure 4B:
FIG. 4B is a diagram illustrating an applied voltage with respect to one phase of the motor and a waveform of a corresponding current.

FIG. 4A illustrates an applied voltage with respect to one phase (one phase coil) of the motor 10, and FIG. 4B illustrates a motor current (phase current). A voltage applied to each phase of the motor 10 is formed from an induced voltage (back electromotive voltage) generated by the motor 10, and output voltages of the first inverter 12 and the second inverter 14 (voltages output by turning on or off the switching elements). In other words, the switching elements of the first inverter 12 and the second inverter 14 are turned on or off by switching signals as illustrated in FIGS. 3A and 3B, and a voltage in one direction for a current flowing from the first inverter 12 to the second inverter 14 is applied to one phase of the motor 10. Since a phase current depends on a voltage to be applied, application of a voltage (phase voltage) as illustrated in FIG. 4A causes a phase current as illustrated in FIG. 4B to flow in one phase of the motor 10.

The shape and ripples of a phase current depend on a voltage to be applied. For example, a PWM controlled carrier (triangular wave) at a low frequency causes large ripples.

"Distribution of Outputs in Two Inverters"

The distribution unit 40 in FIG. 2 distributes the motor voltage vector V to the first and the second inverter voltage vectors V (INV1) and V (INV2) at any ratio based on, for example, various kinds of information (information for distribution) supplied from the vehicle control unit 30 which is a higher-order control unit and based on inverter information that indicates operating states of the first inverter 12 and the second inverter 14. While a motor voltage vector is maintained, the motor voltage vector is distributed to two inverter voltage vectors. Accordingly, this distribution at any ratio involves changes of the motor voltage vector in magnitude, phase, and positive/negative directions.

<Changes in Distribution Ratio of Output>

Figure 5A:
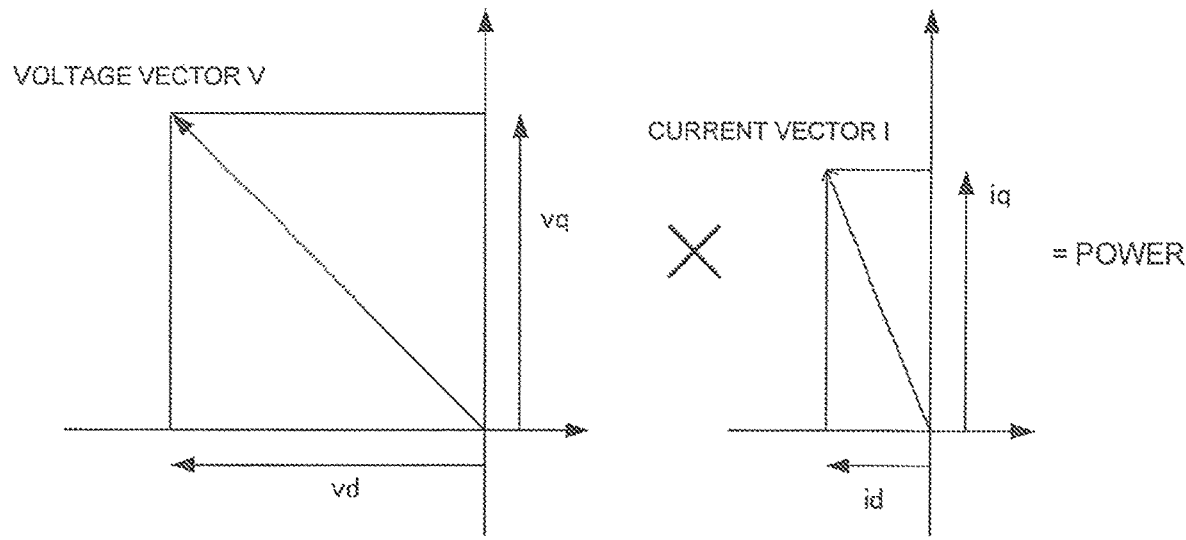
FIG. 5A illustrates distribution of a voltage vector in a case of using one inverter.

FIG. 5A illustrates vector control of a voltage and a current, using one inverter in normal motor drive. The motor voltage vector V (d-axis voltage vd and q-axis voltage vq) and a motor current vector I (d-axis current id and q-axis current iq) are determined according to an output request for the motor 10. The motor voltage×the motor current produces an output (power).

Figure 5B:
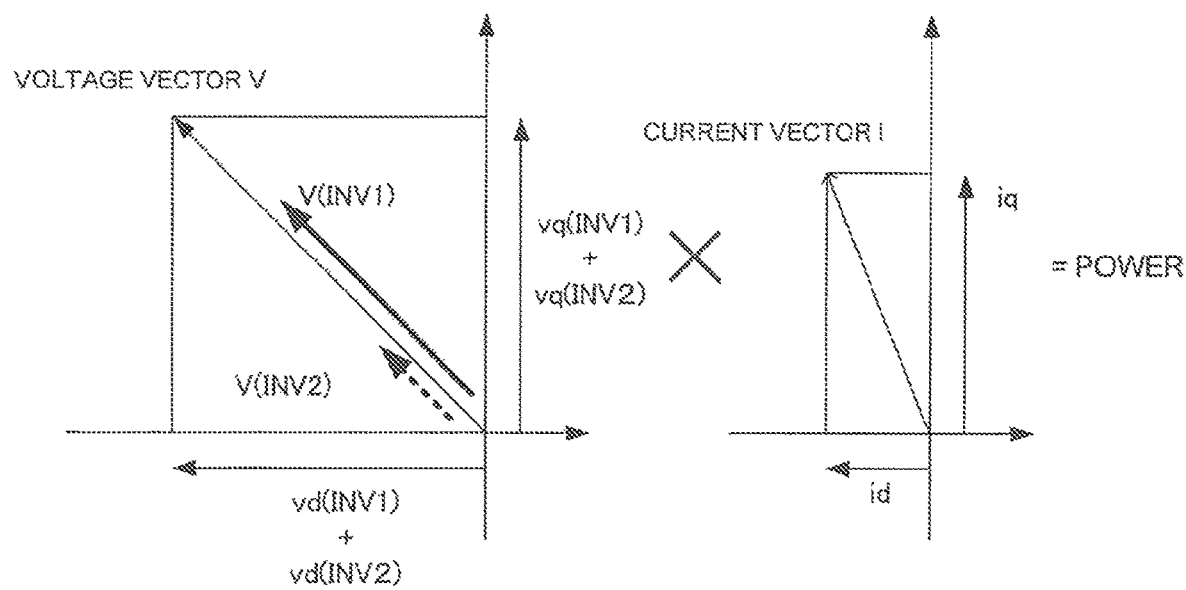
FIG. 5B illustrates distribution of a voltage vector in a case where two inverters have voltage vectors of different magnitude.

The motor system in this embodiment includes two inverters, the first inverter 12 and the second inverter 14. Herein, outputs from the two inverters may be made unequal. In FIG. 5B, the voltage vector V (INV1) of an output from the first inverter 12 (first inverter voltage vector) and the voltage vector V (INV2) of an output from the second inverter 14 (second inverter voltage vector) are changed in magnitude but not in phase. This case does not vary the output (power) from the motor 10 but varies the shape (waveform) of the switching signals in the first inverter 12 and the second inverter 14. Provided that d-axis components of the outputs from the first inverter 12 and the second inverter 14 are vd (INV 1) and vd (INV 2), the d-axis components vd=vd (INV 1)+vd (INV 2), and the q-axis components vq=vq (INV1)+vq (INV2).

Figure 6A:
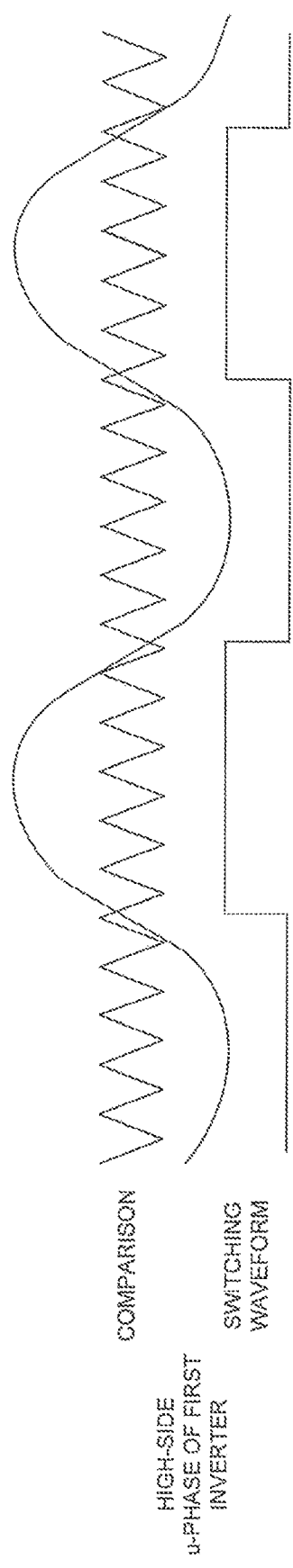
FIG. 6A is a diagram illustrating a switching waveform (at a 60:40 distribution ratio) of the high-side switching element of the first inverter.
Figure 6B:
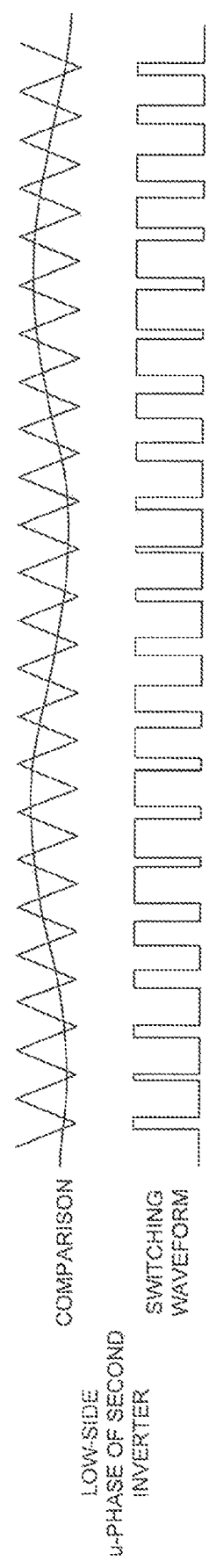
FIG. 6B is a diagram illustrating a switching waveform (at a 60:40 distribution ratio) of the low-side switching element of the second inverter.

FIGS. 6A and 6B illustrate a waveform of the switching signals when the distribution ratio of power is 60:40 in FIG. 5B. FIG. 6A shows 60%, and FIG. 6B shows 40%. In this example, the voltage command is large, causing square wave control in FIG. 6A. In FIG. 6B, the number of switching operations is larger.

Changing a distribution ratio while maintaining the phases of the voltage vectors V (INV1) and V (INV2), or two inverter outputs, as illustrated in FIG. 5B varies the waveform of the switching signals as illustrated in FIGS. 6A and 6B. This leads to variations in shape of a phase voltage with respect to the motor 10, causing an increase or a decrease in number of switching operations and variations in pulse width.

Furthermore, the outputs and losses in the first inverter 12 and the second inverter 14 vary, and heat generated in the first inverter 12 and the second inverter 14 also vary. Moreover, the variations in shape of the phase voltage lead to variations in shape of the phase current, causing variations in sound to be generated as well as in battery current.

In this manner, as the motor voltage vector V is distributed to the voltage vector V (INV1) of the first inverter 12 and the voltage vector V (INV2) of the second inverter 14 at any ratio, it is possible to meet requirements for the system.

<Changes in Magnitude of Voltage Vector>

Figure 7A:
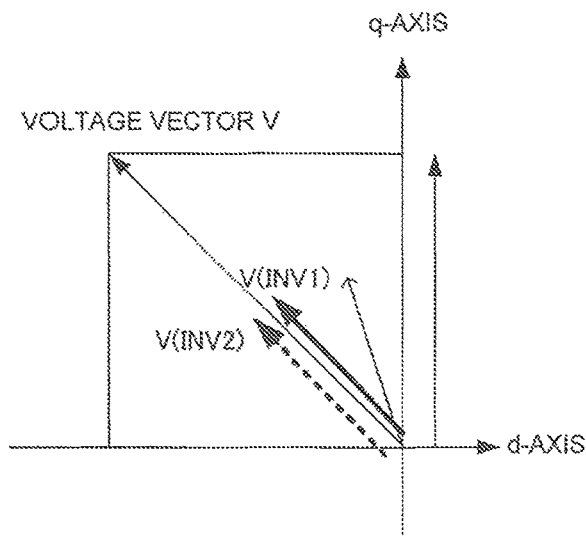
FIG. 7A a diagram illustrating distribution of voltage vectors at equivalent distribution ratios in powering mode.
Figure 7B:
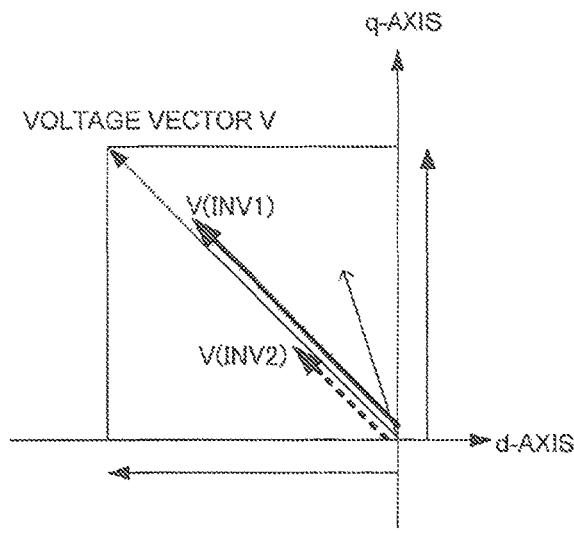
FIG. 7B a diagram illustrating distribution of voltage vectors at different distribution ratios in powering mode.

FIGS. 7A and 7B illustrate a case where, in powering mode (state of energy consumption), the voltage vector V (INV1) of the first inverter 12 and the voltage vector V (INV2) of the second inverter 14 are changed in magnitude but maintained in phase. In FIG. 7A, the magnitude of the voltage vector V (INV1) of the first inverter 12 and the magnitude of the voltage vector V (INV2) of the second inverter 14 are made equal and are distributed equally. However, in FIG. 7B, the voltage vector V (INV1) of the first inverter 12 is large and the voltage vector V (INV2) of the second inverter 14 is small. Accordingly, a load on the first inverter 12 is large, and a load on the second inverter 14 is small. As described above, the switching waveform and the like are also different between those two inverters.

Figure 7C:
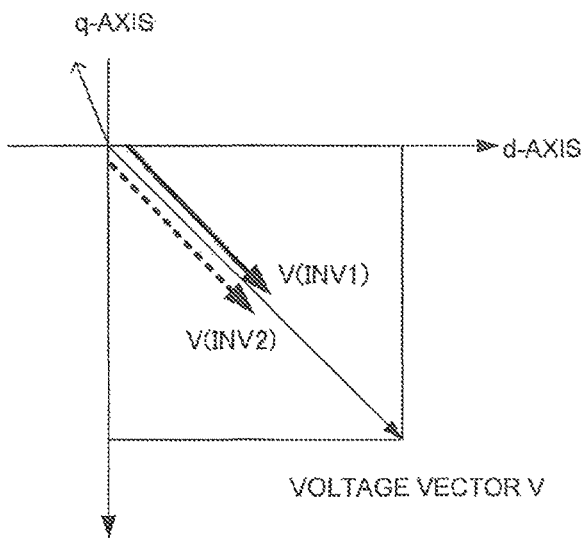
FIG. 7C a diagram illustrating distribution of voltage vectors at equivalent distribution ratios in regeneration mode.
Figure 7D:
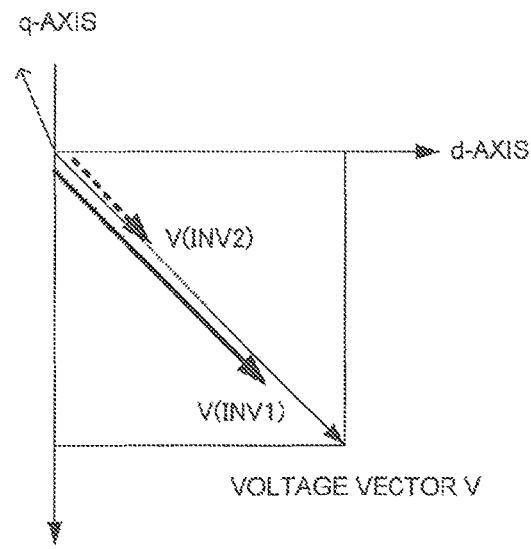
FIG. 7D a diagram illustrating distribution of voltage vectors at different distribution ratios in regeneration mode.

FIGS. 7C and 7D illustrate a case where, in regeneration mode (state of energy recovery), the voltage vector V (INV1) of the first inverter 12 and the voltage vector V (INV2) of the second inverter 14 are changed in magnitude but maintained, in phase. In FIG. 7C, the magnitude of the voltage vector V (INV1) of the first inverter 12 and the magnitude of the voltage vector V (INV2) of the second inverter 14 are made equal. However, in FIG. 7D, the voltage vector V (INV1) of the first inverter 12 is large and the voltage vector V (INV2) of the second inverter 14 is small. Accordingly, a load on the first inverter 12 is large, and a load on the second inverter 14 is small. As described above, the switching waveform and the like are different between those two inverters.

In FIGS. 7A to 7D and other drawings, when the vectors overlap each other, those vectors are appropriately shifted to facilitate visualization.

<Change in Positive/Negative Direction (Sign) of Voltage Vector>

It is also possible to change a positive or a negative direction of either the voltage vector V (INV1) of the first inverter 12 or the voltage vector V (INV2) of the second inverter 14 without changing the motor voltage vector V.

Figure 8:
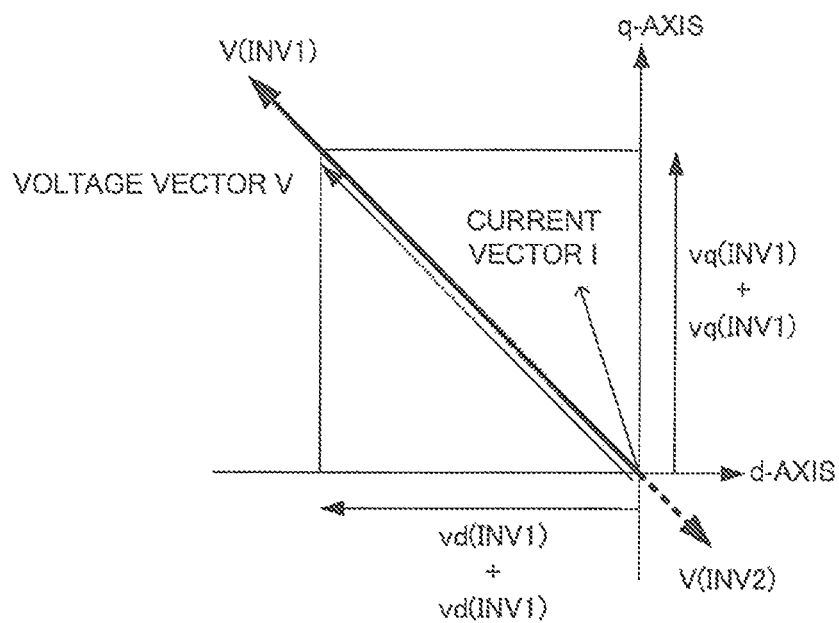
FIG. 8 is a diagram for describing distribution of voltage vectors in a case where one voltage vector is oriented to the regeneration side in powering mode.

In FIG. 8, the voltage vector V (INV1) of the first inverter 12 is increased with respect to the motor voltage vector V by a predetermined amount, and the voltage vector V (INV2) of the second inverter 14 is oriented to the regeneration side in equal amount. Accordingly, one of two inverters is in a state of energy consumption, while the other is in a state of energy flow. In this example, the second inverter 14 generates power to charge the second battery 22 without changing the motor voltage vector V (the powering mode).

Figure 9:
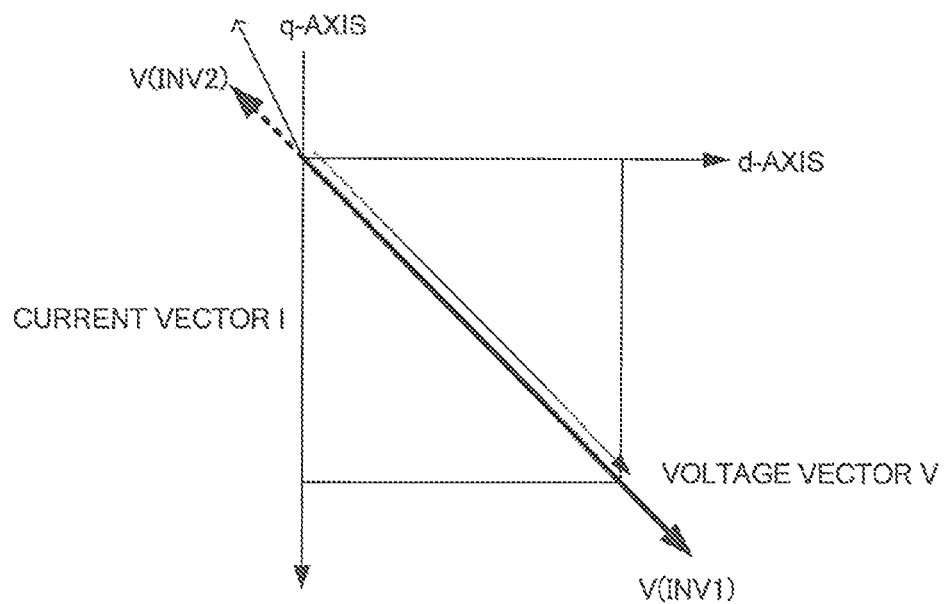
FIG. 9 is a diagram for describing distribution of voltage vectors in a case where one voltage vector is oriented to the powering side in regeneration mode.

In FIG. 9, in regeneration mode, the voltage vector V (INV1) of the first inverter 12 is increased with respect to the motor voltage vector V by a predetermined amount in the regeneration side, and the voltage vector V (INV2) of the second inverter 14 is oriented to the powering side in equal amount. Accordingly, the second inverter 14 consumes energy in powering mode without changing the motor voltage vector V (regeneration mode).

<Changes in Phase of Voltage Vector>

It is also possible to change the voltage vector V (INV1) of the first inverter 12 and the voltage vector V (INV2) of the second inverter 14 in phase. A change in phase changes a power factor in outputs from two inverters.

Figure 10A:
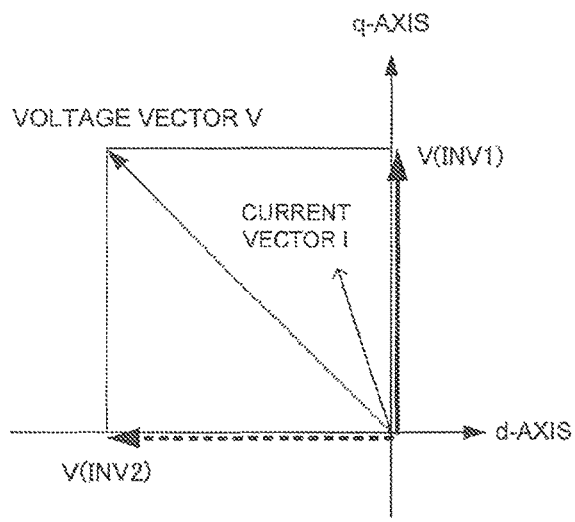
FIG. 10A is a diagram illustrating distribution of voltage vectors of two inverters when an output of one inverter is an excitation component (d-axis) and an output of the other inverter is a torque component (q-axis)

In FIG. 10A, while maintaining the motor voltage vector V and the motor current vector I, the voltage vector V (INV1) of the first inverter 12 is set to a q-axis voltage and the voltage vector V (INV2) of the second inverter 14 is set to a d-axis voltage to change the roles of the two inverters.

Figure 10B:
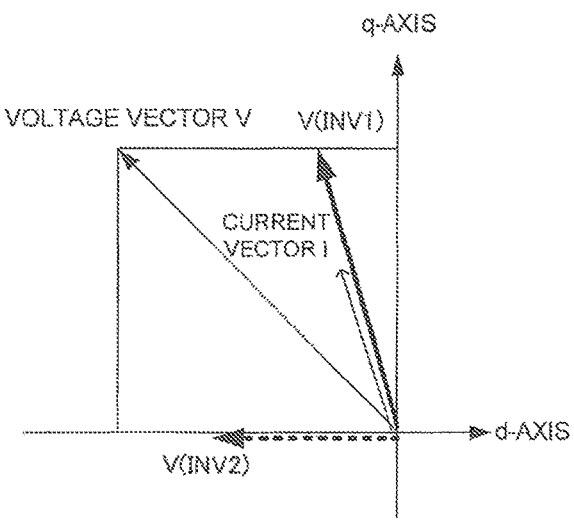
FIG. 10B is a diagram illustrating distribution of voltage vectors of two inverters when an output of one inverter is brought into line with a motor current vector in phase and an output of the other inverter is an excitation component.
Figure 10C:
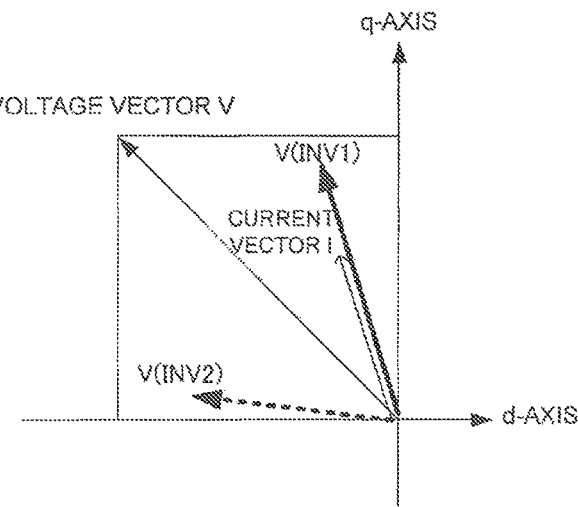
FIG. 10C is a diagram illustrating distribution of voltage vectors of two inverters when an output of one inverter is brought into line with the motor current vector in phase and an output of the other inverter is equivalent to the remaining excitation component and a torque component.

In FIGS. 10B and 10C, the phase of the voltage vector V (INV1) of the first inverter 12 is brought into line with the phase of the motor current vector I. The voltage vector V (INV2) of the second inverter 14 is taken as a difference between the motor voltage vector V. Accordingly, the phase of the voltage vector V (INV1) of the first inverter 12 is made equal to the phase of the motor current vector I, while maintaining the motor voltage vector V and the motor current vector I.

For example, when the first inverter 12 and the second inverter 14 have different efficiencies and when the first inverter 12 offers better efficiency, the phase of the voltage vector V (INV1) of the first inverter 12 is brought into line with the phase of the motor current vector I, as illustrated in FIGS. 10B and 10C, so as to improve a power factor of drive by the first inverter 12 and to enhance efficiency as a whole.

In this manner, a change in phase of voltage vectors from two inverters changes a power factor in outputs from the inverters, which changes a motor voltage vector in magnitude and changes power.

<Input/Output Requirement of Battery>

Figure 11A:
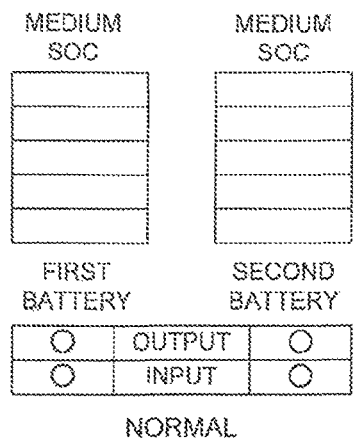
FIG. 11A is a diagram illustrating a relation between SOCs and inputs/outputs with respect to batteries when both of the batteries are in medium SOCs.
Figures 11B, 11C:
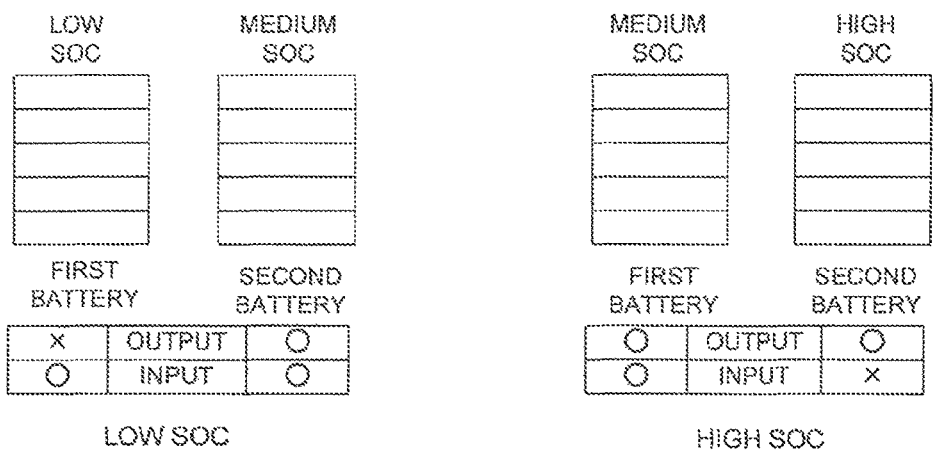
FIG. 11B is a diagram illustrating a relation between SOCs and inputs/outputs with respect to batteries when one of the batteries is in a low SOC.
FIG. 11C is a diagram illustrating a relation between SOCs and inputs/outputs with respect to batteries when one of the batteries is in a high SOC.

FIGS. 11A, 11B, and 11C illustrate the first battery 18 and the second battery 22 in (medium), (low), or (high) states of charge (SOCs).

In FIG. 11A, the first battery 18 and the second battery 22 are both in medium SOCs, allowing outputs and inputs so as to be used in normal mode.

In FIG. 11B, the SOC is low; specifically, the SOC of the first battery 18 is low. In this state, an output from the first battery 18 is limited (the voltage vector is small or 0). For example, the first inverter 12 is operated in regeneration mode to charge the first battery 18. Then, the motor 10 is driven by power from the second inverter 14. Even in powering mode, an output from the second inverter 14 may be larger than an output from the motor 10 to put the first inverter 12 in regeneration mode.

In FIG. 11C, the SOC is high; specifically, the SOC of the second battery 22 is high. In this state, an input to the second battery 22 is limited (the voltage vector is small or 0). For example, the second inverter 14 is operated in powering mode to discharge the second battery 22. In regeneration mode, regenerative power in the first inverter 12 may be larger than regenerative power of the motor 10, and the second inverter 14 may be in a state of energy consumption.

<Temperature Condition>

Figures 12A, 12B:
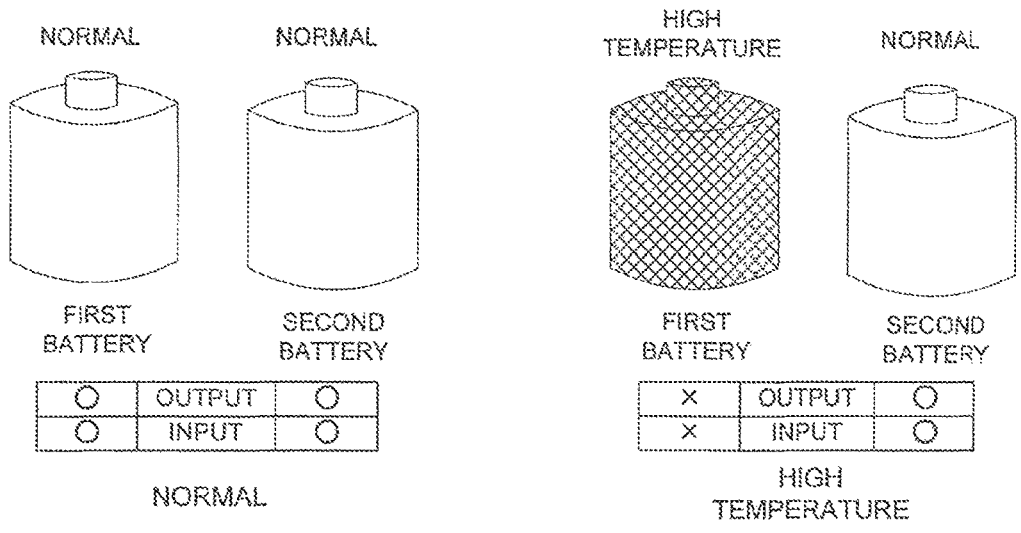
FIG. 12A is a diagram illustrating a relation between temperatures and inputs/outputs with respect to batteries when both of the batteries are at normal temperatures.
FIG. 12B is a diagram illustrating a relation between temperatures and inputs/outputs with respect to batteries when one of the batteries is at a high temperature.

FIGS. 12A and 12B illustrate the first battery 18 and the second battery 22 at a normal temperature or at a high temperature which is higher than the normal temperature. In some embodiments, the first battery 18 is at a high temperature when the temperature of the first battery 18 is equal to or higher than a battery temperature threshold, and the first battery 18 is at a normal temperature when the temperature of the first battery 18 is less than the battery temperature threshold. In some embodiments, the second battery 22 is at a high temperature when the temperature of the second battery 22 is equal to or higher than the battery temperature threshold, and the second battery 22 is at a normal temperature when the temperature of the second battery 22 is less than the battery temperature threshold.

In FIG. 12A, the first battery 18 and the second battery 22 are both at normal temperatures, allowing output and input so as to be used in normal mode.

In FIG. 12B, the temperature of the first battery 18 is high. In this state, an input or an output of the first battery 18 is limited (the voltage vector is small or 0). For example, using the second inverter 14, the motor 10 is operated with power from the second battery 22.

When the temperature one of the first inverter 12 and the second inverter 14 is at a high temperature that is higher than a normal temperature, the use of the high-temperature inverter may be limited, similarly to the high-temperature battery. In some embodiments, the first inverter 12 is at a high temperature when the temperature of the first inverter 12 is equal to or higher than an inverter temperature threshold, and the first inverter 12 is at a normal temperature when the temperature of the first inverter 12 is less than the inverter temperature threshold. In some embodiments, the second inverter 14 is at a high temperature when the temperature of the second inverter 14 is equal to or higher than the inverter temperature threshold, and the second inverter 14 is at a normal temperature when the temperature of the second inverter 14 is less than the inverter temperature threshold.

<Power Request Requirement and the like>

In a motor system which is mounted on a vehicle and used for running the vehicle, a torque request (power request) for the motor 10 is determined according to operating states of an accelerator and a brake. Furthermore, charging requests and the like are also generated according to the SOCs of the first battery 18 and the second battery 22.

In this embodiment, the first battery 18 and the second battery 22 are provided in the motor system, and the two batteries may have different SOCs. In such a case, the SOCs of the first battery 18 and the second battery 22 may be averaged by changing the voltage vectors as described above. In a case where a request for powering or regeneration is extremely large, both batteries may be in powering mode or in regeneration mode.

Figure 13A:
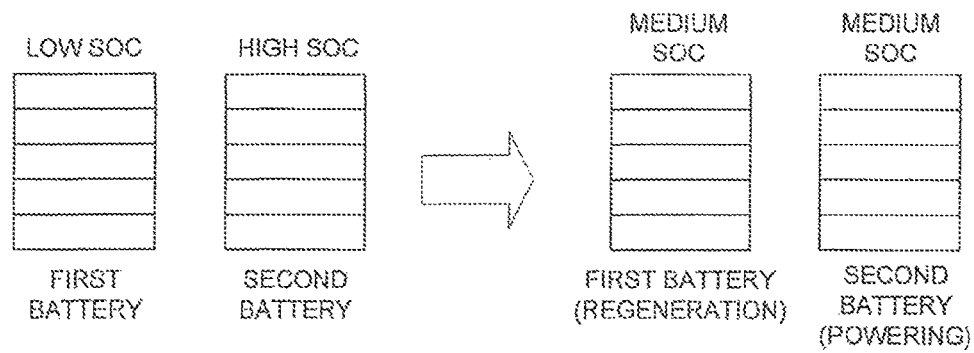
FIG. 13A is a diagram illustrating how to average SOCs of two batteries when one battery is in regeneration mode and the other is in powering mode.

In FIG. 13A, the SOC of the first battery 18 is low and the SOC of the second battery 22 is high. In this state, regardless of whether a request for the vehicle is powering or regeneration, an output from the first inverter 12 is set to regeneration, and an output from the second inverter 14 is set to powering. Accordingly, the SOCs of the first battery 18 and the second battery 22 are averaged.

Figure 13B:
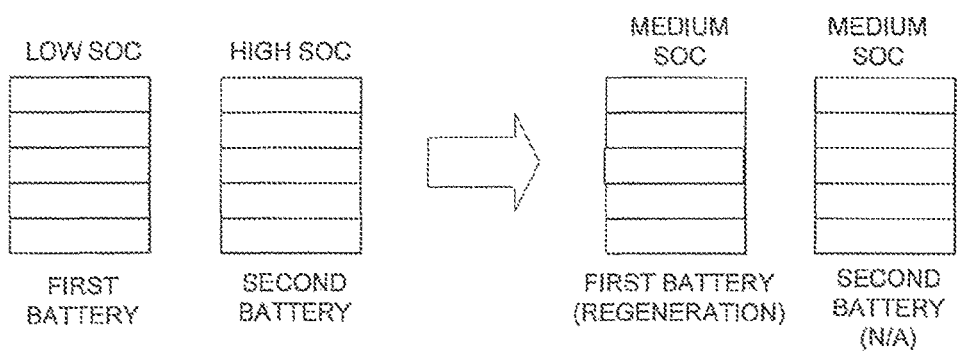
FIG. 13B is a diagram illustrating how to average SOCs of two batteries when one battery is in regeneration mode and the other is not used.

In FIG. 13B, the SOC of the first battery 18 is low and the SOC of the second battery 22 is high. In this state, when a request for the vehicle is regeneration, an output from the first inverter 12 is set to regeneration, and the use of the second inverter 14 is stopped. Accordingly, the SOCs of the first battery 18 and the second battery 22 are averaged.

Figure 13C:
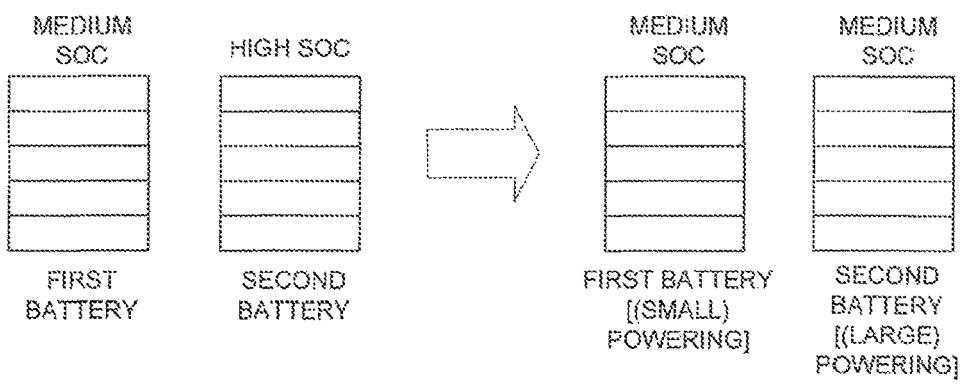
FIG. 13C is a diagram illustrating how to average SOCs of two batteries when one battery is in (small) powering mode and the other battery is in (large) powering mode.

In FIG. 13C, the first battery 18 is in a medium SOC, while the second battery 22 is in a higher SOC. In this state, when a request for the vehicle is powering, an output from the first inverter 12 is set to powering with a relatively small output, and an output from the second inverter 14 is set to powering with a relatively large output. Accordingly, the SOCs of the first battery 18 and the second battery 22 are averaged.

Figure 13D:
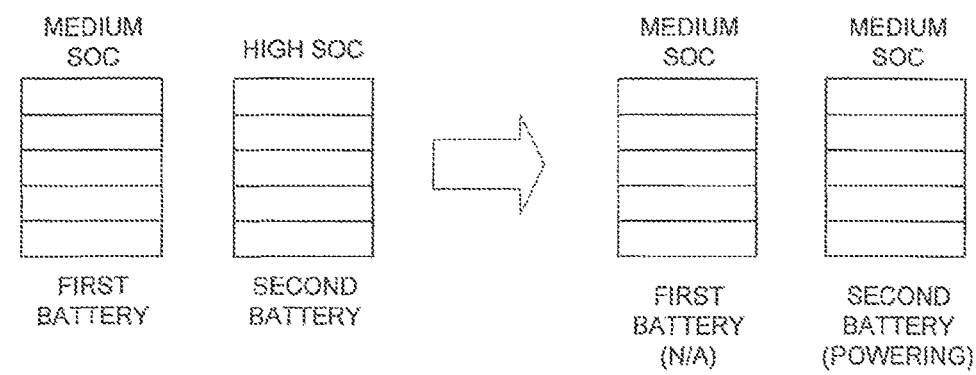
FIG. 13D is a diagram illustrating how to average SOCs of two batteries when one battery is not used and the other battery is in powering mode.

In FIG. 13D, the first battery 18 is in a medium SOC, while the second battery 22 is in a higher SOC. In this state, when a request for the vehicle is powering, the use of the first inverter 12 is stopped, and an output from the second inverter 14 is set to powering. Accordingly, the SOCs of the first battery 18 and the second battery 22 are averaged.

<Efficiency Requirement>

In a case where the first battery 18 and the second battery 22 are different, losses may be different even though two voltage vectors are same. In such a case, losses of outputs from two inverters at each operating point may be determined in advance and stored. Losses in a case of distributing one voltage vector V to the two voltage vectors V (INV1) and V (INV2) may be calculated, and the distribution may be performed so that the voltage vector with smaller losses becomes larger.

Furthermore, as described above, when phases of voltage vectors are brought into line with a motor current vector, a power factor increases. Therefore, one voltage vector may be brought into line with the motor current vector, and this ratio may be increased to operate a system in a state of high power factor.

<Noise Prevention Requirement>

Noise may be generated based on ripples of a motor current due to a PWM carrier. This is because ripples concentrate at a specific frequency.

Changes in distribution ratio of the magnitude or changes in phase of the voltage vector V (INV1) of the first inverter 12 and the voltage vector V (INV2) of the second inverter 14 change switching positions in the inverters. This causes a change in shape of a three-phase current of the motor 10. Accordingly, a frequency of ripples is dispersed, leading to prevention of noise.

Figure 14:
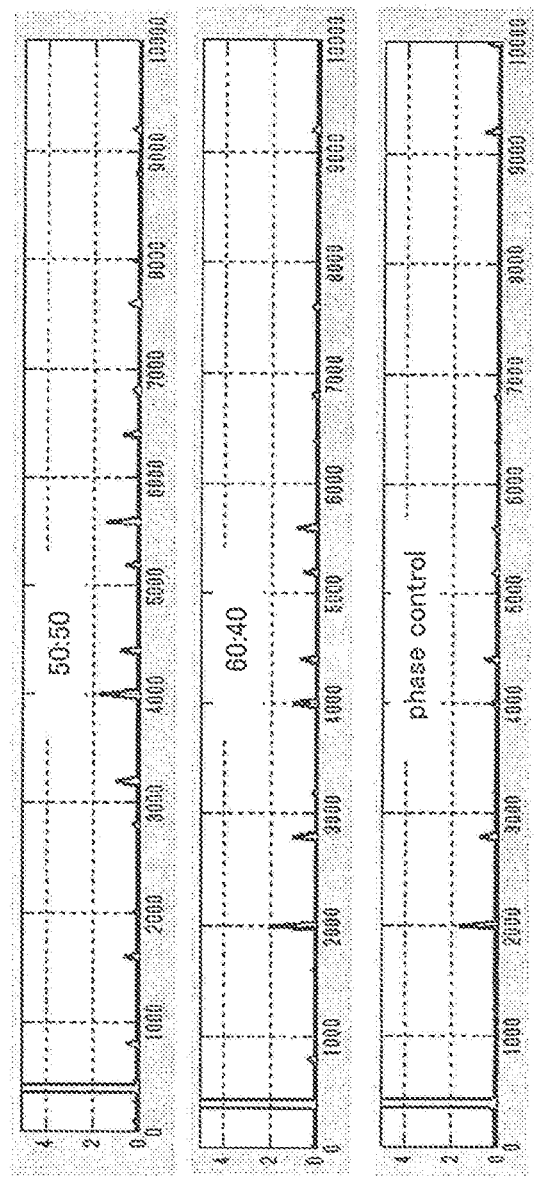
FIG. 14 is a diagram illustrating results of frequency analysis of noise, in which the upper row illustrates a case where voltage vectors of two inverters are divided at a 50:50 ratio, the middle row illustrates a case where the voltage vectors are divided at a 60:40 ratio, and the lower row illustrates a case where an inverter voltage vector of the first inverter is brought into line with the motor current vector in phase.

FIG. 14 is a diagram illustrating results of frequency analysis of noise by fast Fourier transform (FFT). The upper row of FIG. 14 illustrates a case where the voltage vectors V(INV1) and V(INV2) of the two inverters 12 and 14 are divided at a 50:50 ratio (FIG. 5A), the middle row of FIG. 14 illustrates a case where the voltage vectors V(INV1) and V(INV2) are divided at a 60:40 ratio, and the lower row illustrates a case where the voltage vector V (INV1) of the first inverter 12 is brought into line with a motor current vector in phase (FIG. 10B). In this manner, when two inverters are caused to perform similar operation as illustrated in the upper row of FIG. 14, the number of high peaks increase. Accordingly, changes in distribution ratio and in phase enable prevention of noise.

<Battery Current Ripples>

If a motor current has large ripples, the ripples in a battery current of the first battery 18 and the second battery 22 may also be large. Specifically, the first capacitor 16 and the second capacitor 20 are connected in parallel to the first battery 18 and the second battery 22, and an LC resonance circuit is formed. When a ripple frequency matches a resonance frequency, the battery current ripples become large.

Figure 15:
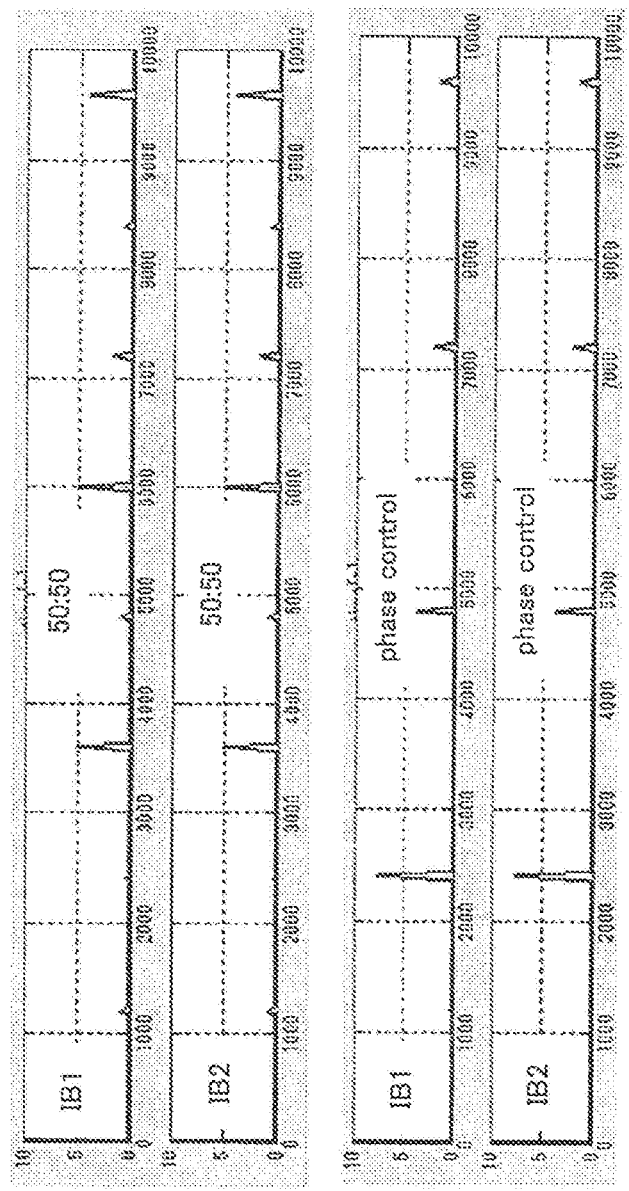
FIG. 15 is a diagram illustrating current ripples of first and second batteries, in which each of the first and second rows illustrates a case where inverter voltage vectors of two inverters are divided at a 50:50 ratio, and each of the third and fourth rows illustrates a case where the inverter voltage vector of the first inverter is brought into line with the motor current vector in phase.

FIG. 15 is a diagram illustrating current ripples of the first battery 18 and the second battery 22. The first and the second rows of FIG. 15 illustrate a case where the voltage vectors V(INV1) and V(INV2) of the two inverters 12 and 14 are divided at a 50:50 ratio (FIG. 5A), and the third and the fourth rows of FIG. 15 illustrate a case where the voltage vector V (INV1) of the first inverter 12 is brought into line with a motor current vector in phase (FIG. 10B).

In this manner, a change in distribution causes a change in frequency of current ripples, which makes the frequency of the current ripples different from the resonance frequency.

<Control Requirement>

In a vehicle, an output of the motor 10 may be limited according to various requests. For example, when deterioration of a battery is accelerated, a large output is prohibited. According to such a request, for example, distribution of voltage vectors of two inverter outputs may be reconsidered or a maximum voltage vector may be limited. Alternatively, maximum and minimum of a motor output itself may be set to determine the voltage vector.

<Excess Energy>

In a case where a vehicle runs on a long downhill, regenerative power may be excessive. For example, when one battery is almost fully charged and the other battery is charged sufficiently, it is possible to lower an SOC of one inverter in powering mode by large regeneration performed by the other inverter. In this case, a necessary regenerative brake may be maintained. Furthermore, such motor drive is relatively inefficient, which allows discard of energy.

<At the Time of Failure>

In this embodiment, when one of the first battery 18 and the second battery 22 or one of the first inverter 12 and the second inverter 14 fails, the failed battery or the failed inverter is not able to supply power to the motor 10. In such a case, it is possible to run a vehicle with the battery or the inverter which is still working. For example, when the second battery 22 fails, the motor 10 may be driven by the first inverter 12 with power from the first battery 18.

Even without sufficient drive force, it is possible to run the vehicle in limp mode so as to pull the vehicle to the side of a road.

<Avoidance of Current Zero Crossing>

In PWM control, in order not to turn on both a high-side switching element and a low-side switching element simultaneously, a predetermined dead time section is provided in switching timing. This dead time section may include the timing of zero crossing of a phase current, and the zero crossing may be repeated at a predetermined cycle.

In current zero crossing in such a dead time section, a voltage vector in the dead time section depends on a direction of a current, and an applied amount of the actual voltage changes randomly.

Figure 16:
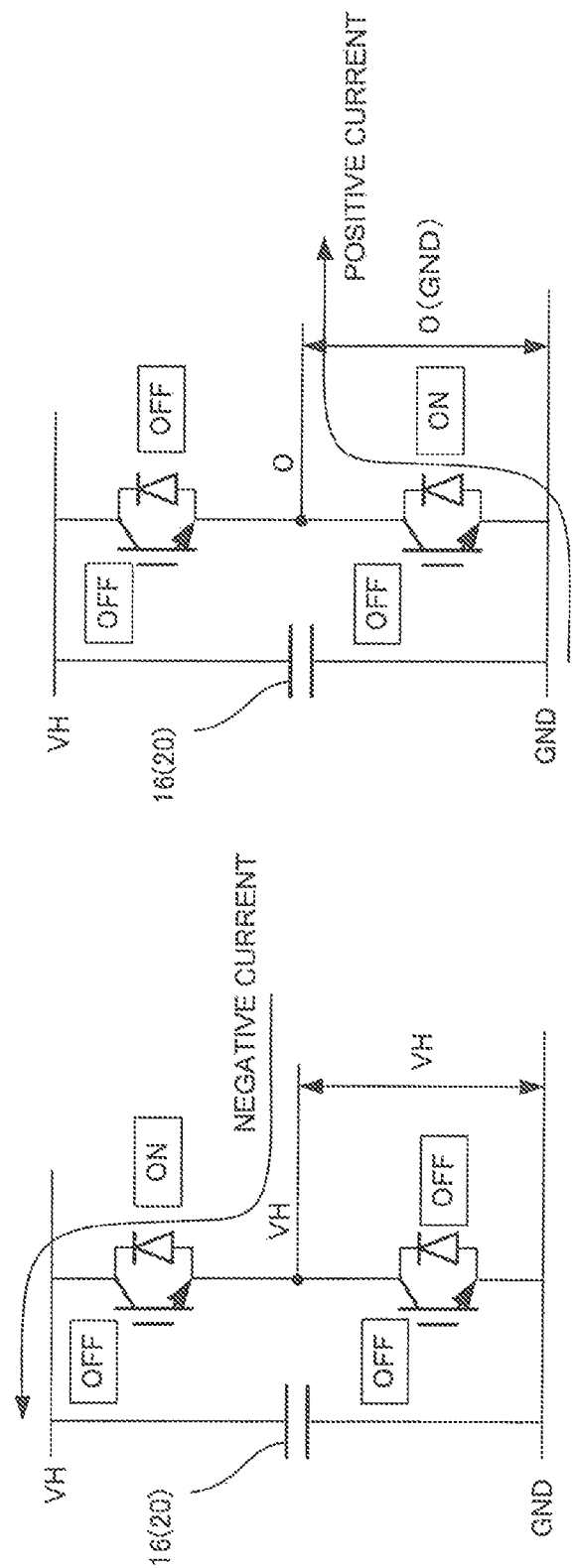
FIG. 16A is a diagram illustrating a direction of a current in a dead time when a low-side switching element is turned off.
FIG. 16B is a diagram illustrating a direction of a current in a dead time when a high-side switching element is turned off.

For example, in a situation where the low-side switching element is turned on, turning on and off the high-side and the low-side switching elements in the dead time section (period) turns on a diode of the high-side switching element, as illustrated in FIG. 16A, causing a flow of a current from a motor to an inverter. Accordingly, a voltage at the end of a motor coil becomes VH, which is a voltage in the positive side of the inverter. On the other hand, in a situation where the high-side switching element is turned on, turning on and off the high-side and the low-side switching elements in the dead time section turns on a diode of the low-side switching element, as illustrated in FIG. 16B, causing a flow of a current from GND to the motor. Accordingly, the voltage at the end of the motor coil is GND.

Figure 17:
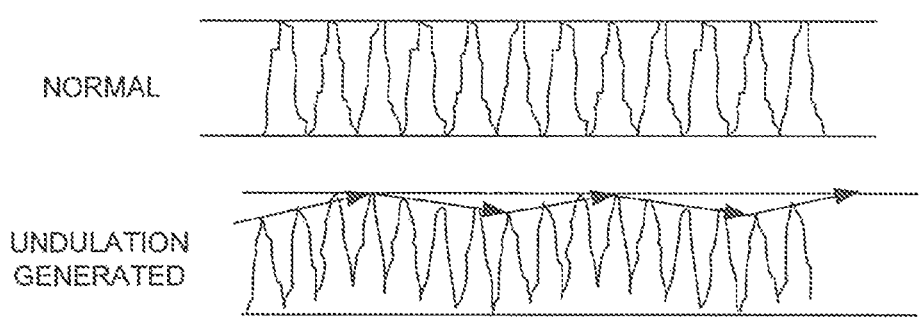
FIG. 17 is a diagram illustrating a state where undulation occurs in an applied voltage by a current in a dead time, in which the upper row illustrates a normal case, and the lower row illustrates a case with undulation.

For example, in a situation where a motor current is not changed, the switching timing is not changed as well, and when the dead time section includes the timing of zero crossing of a phase current, the phenomena illustrated in FIGS. 16A and 16B occur randomly. This causes undulation in an applied voltage with respect to a motor coil (phase coil) as illustrated in FIG. 17.

Therefore, the phase of a voltage vector may be intentionally changed so as to change a positional relationship with the timing of current zero crossing and so as not to overlap the timing of current zero crossing in the dead time section.

For example, changes in phase of the voltage vector V (INV1) of the first inverter 12 and the voltage vector V (INV2) of the second inverter 14 cause a change in positional relationship with the phase current. Accordingly, it is possible to deviate from the dead time section by shifting the timing of current zero crossing.

"Other Arrangement"

In FIG. 2, the motor control block 32 is arranged differently from the vehicle control unit 30 which is a higher-order control unit. However, the vehicle control unit 30 may execute the functions of the motor control block 32. Furthermore, the motor control block 32 may include a lower-order microcomputer. Moreover, all or part of the motor control, block 32 may include hardware.

The motor control block 32 may include a plurality of CPUs. In this case, the functions may be divided so that each CPU executes each function. In a case where the motor control unit 32 includes the plurality of CPUs, each CPU may be configured to execute the entire processing.

In the embodiment, two power supplies and two inverters are used. However, a system may include three or more power supplies and three or more inverters, and a plurality of inverters may be controlled based on a total voltage.

Two inverters may be controlled by a system provided with two power supplies and two inverters based on a total voltage. Alternatively, two inverters may be controlled by two CPUs in a system provided with two power supplies and two inverters based on a total voltage. With such an arrangement, even when one CPU fails, it is possible to drive a motor by the other CPU.

The invention claimed is:

1. A motor system, comprising:
a first inverter which converts direct current power from a first power supply into alternating current power;
a second inverter which converts direct current power from a second power supply into alternating current power;
a motor which is driven by the alternating current power from the first inverter and the alternating current power from the second inverter, the motor has a plurality of coils from which the alternating current power from the first inverter is supplied and the alternating current power from the second inverter is supplied, the first inverter is connected to one end of each of the plurality of coils and the second inverter is connected to the other end of each of the plurality of coils; and
a control unit which is configured to calculate a motor voltage vector including a corresponding excitation voltage command and a torque voltage command in response to an output request for the motor and changes a first inverter voltage vector and a second inverter voltage vector while maintaining the motor voltage vector obtained to allow distribution of the motor voltage vector at any distribution ratio of the first inverter voltage vector to the second inverter voltage vector, and
the control unit is configured to, according to a state of charge of the first power supply and a state of charge of the second power supply, increase the distribution ratio of the first inverter voltage vector during a powering mode so that an output of the first power supply is reduced when the state of charge of the first power supply is high compared to when the state of charge of the first power supply is low, or decrease the distribution ratio of the first inverter voltage vector during a regeneration mode so that an input of the first power supply is reduced when the state of charge of the first power supply is high compared to when the state of charge of the first power supply is low,
wherein the first inverter voltage vector includes a first excitation voltage command and a first torque voltage command associated with an output from the first inverter, and the second inverter voltage vector includes a second excitation voltage command and a second torque voltage command associated with an output from the second inverter.

2. The motor system according to claim 1,
wherein the control unit configured to change the first inverter voltage vector and the second inverter voltage vector in magnitude.

3. The motor system according to claim 2,
wherein the control unit configured to invert a positive or a negative direction of either the first inverter voltage vector or the second inverter voltage vector with respect to a positive or a negative direction of the motor voltage vector.

4. The motor system according to claim 1,
wherein the control unit configured to change at least one of the first inverter voltage vector and the second inverter voltage vector in phase.

5. The motor system according to claim 4,
wherein the control unit configured to calculate the phase of the first inverter voltage vector and the phase of the second inverter voltage vector based on a phase of a motor current.

6. The motor system according to claim 1,
wherein the first power supply and the second power supply include an electric storage device, and
the control unit configured to change the first inverter voltage vector and the second inverter voltage vector in magnitude to reduce an output from a low-charged power supply or to restrict charging of a high-charged power supply according to states of charge of the first power supply and the second power supply.

7. The motor system according to claim 1,
wherein the control unit configured to change the first inverter voltage vector and the second inverter voltage vector in magnitude to restrict an output from a high-temperature inverter according to temperatures of the first inverter and the second inverter.

8. The motor system according to claim 1,
wherein the control unit configured to change the first inverter voltage vector and the second inverter voltage vector in magnitude or in phase to change a motor current in shape.

9. The motor system according to claim 1,
wherein the first inverter and the second inverter control a motor current by PWM, and
the control unit configured to change the first inverter voltage vector and the second inverter voltage vector in phase to shift a dead time section in switching the first and the second inverters and a zero-crossing position of a motor current.

10. The motor system according to claim 1,
wherein the first power supply and the second power supply include an electric storage device, and
the control unit configured to change the first inverter voltage vector and the second inverter voltage vector in magnitude or in phase according to states of charge of the first power supply and the second power supply.

11. The motor system according to claim 1,
wherein the control unit configured to change the first inverter voltage vector and the second inverter voltage vector in magnitude or in phase to restrict an output from a high-temperature power supply according to temperatures of the first power supply and the second power supply.

12. The motor system according to claim 1, wherein, when the state of charge of the first power supply is high compared to when the state of charge of the first power supply is low, the voltage vector is distributed so that the second inverter voltage vector is increased toward a further regenerative side than the voltage vector on a regeneration side, and the first inverter voltage vector is set to a powering side.

13. The motor system according to claim 1, wherein, when the state of charge of the first power supply is high compared to when the state of charge of the first power supply is low, and the state of charge of the second power supply is low compared to when the state of charge of the second power supply is high, the first inverter voltage vector is set to a regeneration side and an output of the second inverter is set to a powering side regardless of whether the voltage vector is on the powering side or the regeneration side.

14. A motor system, comprising:
a plurality of power supplies;
a plurality of inverters; and
a control unit,
wherein the control unit is configured to maintain a motor voltage vector obtained by synthesizing a voltage vector from each inverter and to distribute the motor voltage vector V to the voltage vector from each inverter, and
the control unit is configured to, according to a state of charge of the plurality of power supplies, increase a distribution ratio of one of the voltage vectors during a powering mode so that an output of one of the plurality of power supplies is reduced when the state of charge of the one of the plurality of power supplies is high compared to when the state of charge of the one of the plurality of power supplies is low, or decrease the distribution ratio of the one of the voltage vectors during a regeneration mode so that an input of the one of the plurality of power supplies is reduced when the state of charge of the one of the plurality of power supplies is high compared to when the state of charge of the one of the plurality of power supplies is low.

15. The motor system according to claim 14 further comprising:
a motor which is driven by alternating current power from the plurality of inverters, the motor has a plurality of coils from which the alternating current power from the plurality of inverters are supplied, at least one of the plurality of inverters is connected to one end of each of the plurality of coils and at least another of the plurality of inverters is connected to the other end of each of the plurality of coils.

16. The motor system according to claim 14, wherein, when the state of charge of the one of the plurality of power supplies is high compared to when the state of charge of the one of the plurality of power supplies is low, the voltage vector is distributed so that another inverter voltage vector is increased toward a further regenerative side than the one of the voltage vectors on a regeneration side, and the one of the voltage vectors is set to a powering side.

17. The motor system according to claim 14, wherein, when the state of charge of the one of the plurality of power supplies is high compared to when the state of charge of the one of the plurality of power supplies is low, and the state of charge of another one of the plurality of power supplies is low compared to when the state of charge of the another one of the plurality of power supplies is high, the one of the inverter voltage vectors is set to a regeneration side and an output of one of the plurality of inverters is set to a powering side regardless of whether the voltage vector is on the powering side or the regeneration side.

\* \* \* \* \*

UNITED STATES PATENT AND TRADEMARK OFFICE
CERTIFICATE OF CORRECTION

| | | |
|---|---|---|
| PATENT NO. | : 11,239,771 B2 | Page 1 of 1 |
| APPLICATION NO. | : 16/360472 | |
| DATED | : February 1, 2022 | |
| INVENTOR(S) | : Matsubara et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 115 days.

Signed and Sealed this
Fourteenth Day of February, 2023

Katherine Kelly Vidal
*Director of the United States Patent and Trademark Office*